2,949,029
SHAFT HORSE POWER INDICATOR AND RECORDER

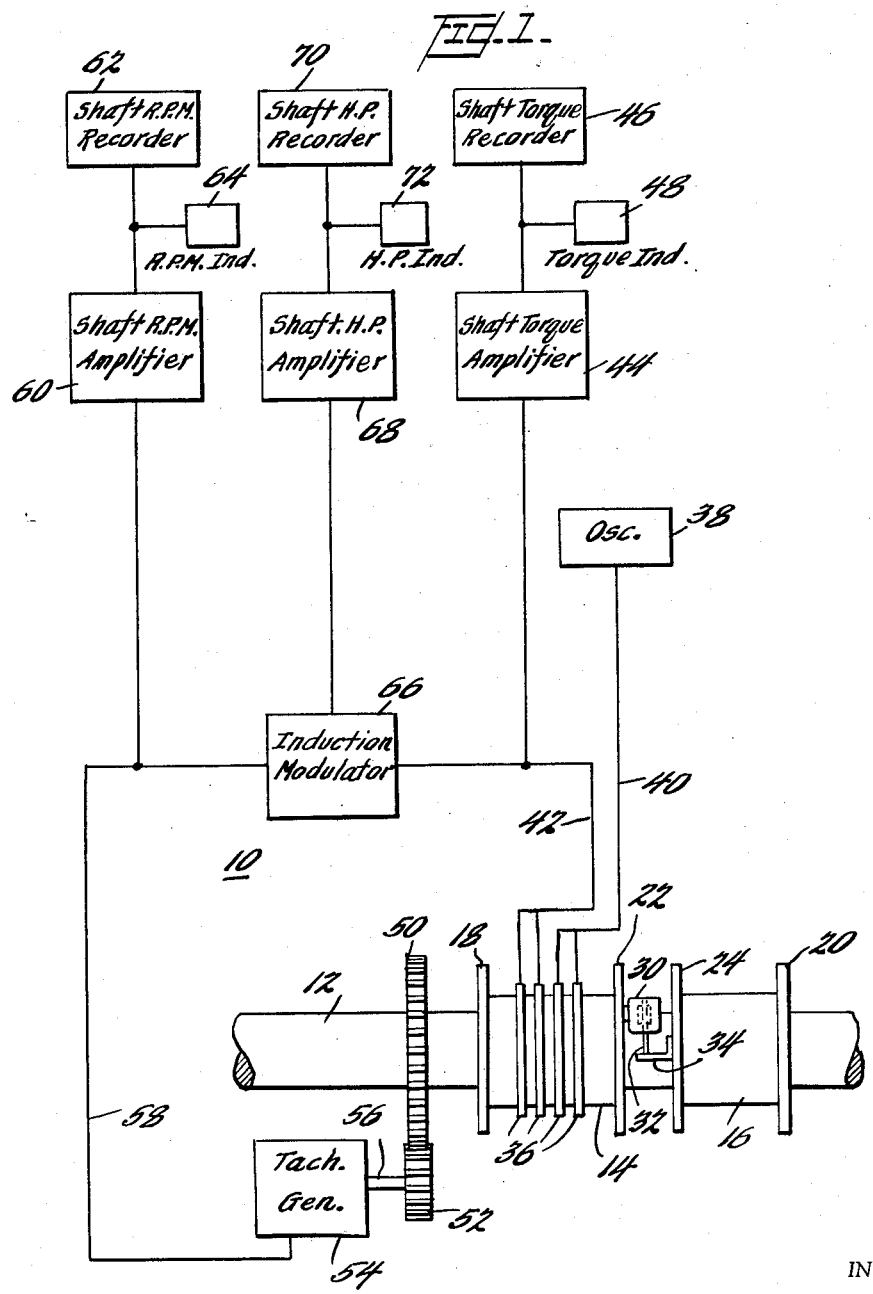

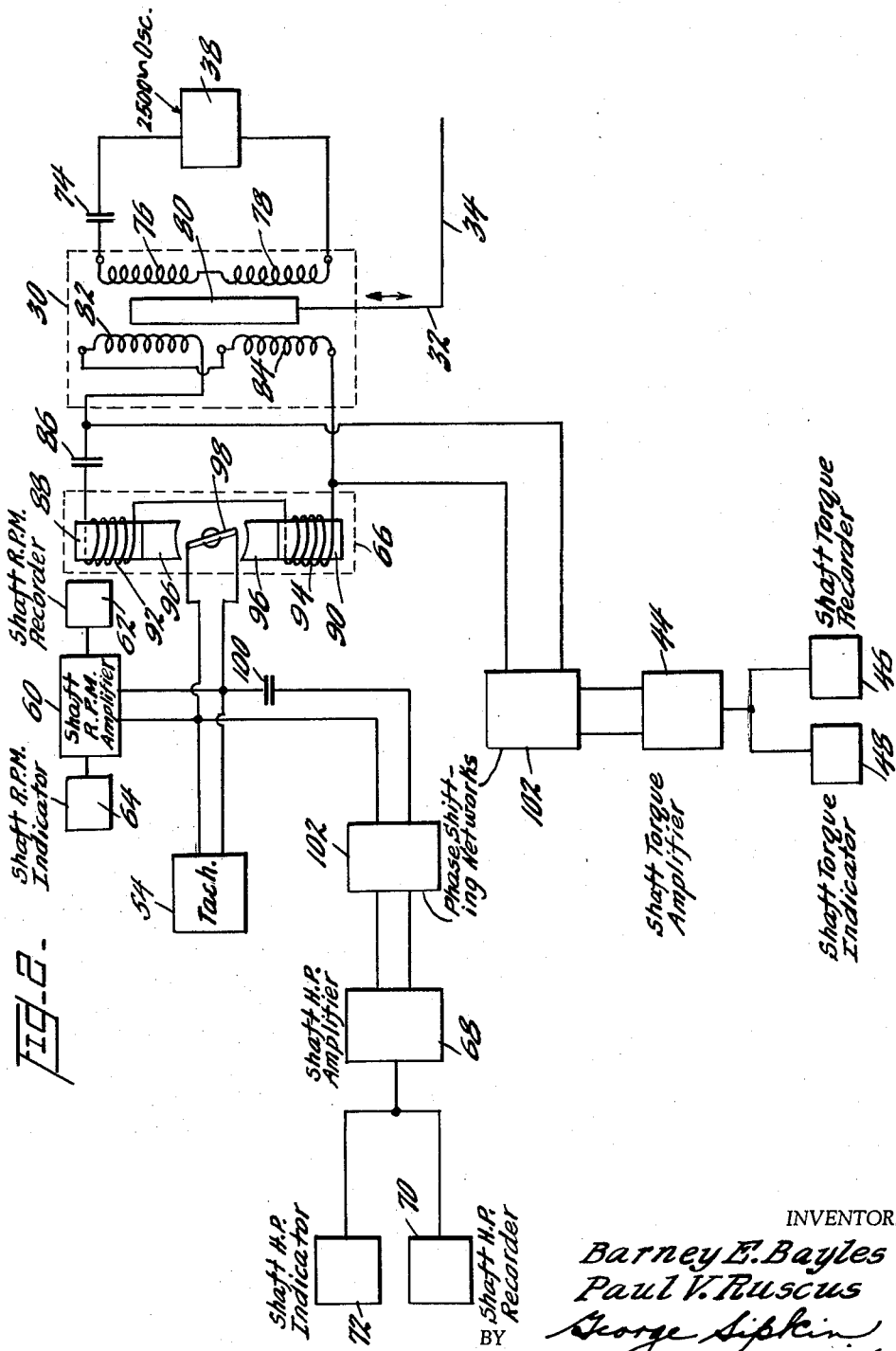

Barney E. Bayles, Rockville, Md., and Paul V. Ruscus, Elizabeth, N.J.

Filed Sept. 24, 1957, Ser. No. 685,991

4 Claims. (Cl. 73—136)

(Granted under Title 35, U.S. Code (1952), sec. 266)

The invention described herein may be manufactured and used by or for the Government of the United States of America for governmental purposes without the payment of any royalties thereon and therefor.

This invention relates to a shaft horse power indicator and recorder and more particularly to a shaft horse power recording system using a linear differential transformer and an induction modulator to obtain an accuracy of less than two percent error in the overall horse power measurement.

In the past a number of horse power recording systems have been designed, but which lack several essential features. One essential feature to a good horse power recording system is to record the shaft horse power, torque, and shaft rotational speed simultaneously during all stages of operation of the shaft including starting, running, and stopping.

As ship engines have become more powerful and efficient the requirement of highly accurate measurement becomes increasingly important in order not to waste valuable and expensive engine power. A primary object of this invention is therefore to provide a highly linear shaft horse power recording system which will have an accuracy of less than two percent error.

Another object of this invention is to provide a horse power recording system where torque, rotational speed, and horse power are continuously recorded and indicated under all conditions of operation.

Another object of this invention is to provide a rugged and reliable torque indicator which may be rotated at high speeds and subjected to a great deal of shock.

Other objects and advantages of the invention will hereinafter become more fully apparent from the following description of the annexed drawings, which illustrate a preferred embodiment, and wherein:

Fig. 1 is a diagrammatic representation of the shaft horse power indicator and recorder; and Fig. 2 is a schematic diagram of the recording system.

Referring to Fig. 1 a recording system is indicated at 10 for measuring the horse power in a shaft 12. In this system the torque in the shaft is measured and multiplied by a quantity which is proportional to the rotational speed of the shaft, thereby obtaining a quantity which is proportional to the horse power transmitted through the shaft.

In order to measure the torque in the shaft which is also proportional to the twist or torsion in the shaft, a husk is shown mounted on the shaft 12 comprising two clamping cylinders 14 and 16. Two outer flanges 18 and 20 are shown at the outer ends of the cylinders and two inner flanges 22 and 24 are shown next to each other. A pair of clamping rings (not shown) are mounted under flanges 18 and 20 so that the husk is clamped to the shaft at its outer end points. Mounted on the inner flange 22 is a linear differential transformer 30 having a movable core which is operated by rod 32 attached to arm 34 which is mounted on flange 24. Since the husk clamps the shaft at flanges 18 and 20, any twist or torsion in the shaft between these flanges will be reflected in a movement of the rod 32 which moves a movable core in the linear differential transformer 30.

A stabilized oscillator 38 feeds an alternating frequency wave of constant frequency and amplitude by line 40 to slip rings 36 where it is fed to the primary of the linear differential transformer 30. The movement of the movable core in the transformer 30 is reflected in an output in the secondaries of the transformer 30 which is proportional to the torque. This torque signal is fed to the slip rings 36 and on line 42 to the shaft torque amplifier 44, shaft torque recorder 46, and torque indicator 48.

In order to measure the rotational speed or r.p.m. of the shaft, a shaft gear 50 is mounted on the shaft 12 with a driven gear 52 engaged therewith. A tachometer generator 54 is driven by gear 52 by means of shaft 56. The output of the generator 54 is fed along line 58 to the shaft r.p.m. amplifier 60, shaft r.p.m. recorder 62, and r.p.m. indicator 64.

In order to measure the horse power of the shaft the torque and r.p.m. signals are fed through an induction modulator 66 which multiplies the two signals together and produces an output proportional to the horse power. This horse power signal is fed to the shaft horse power amplifier 68, horse power recorder 70, and horse power indicator 72.

Referring to Fig. 2 which is a schematic diagram of the system, a 2500 cycle oscillator 38 generates a stabilized signal of constant frequency and amplitude. This stabilized signal is fed to the linear differential transformer 30 by way of tuning capacitor 74 to two series primary windings 76 and 78 within the transformer 30.

Tuning capacitor 74 is adjusted to form a series resonant circuit with primary windings 76 and 78 to achieve a maximum current through the windings 76 and 78 and therefore maximum output on the secondaries 82 and 84 with maximum sensitivity.

This linear differential transformer is described in Patent 2,494,579 by J. R. Pimlott et al. issued January 17, 1950.

Mounted within the primary windings 76 and 78 is a movable magnetic core 80 which is shown being operated by rod 32 and arm 34. A pair of equal secondary windings 82 and 84 are connected in series opposition and are wound coaxially with the input windings 76 and 78 and movable core 80. With the oscillator signal on the input windings and with the movable core 80 in the electrical center of the windings, it can be seen that no output voltage or a null will be obtained at the output of the combined secondary windings 82 and 84. When the movable core 80, however, is moved away from the electrical center, a larger voltage is induced in one of the secondary windings and a smaller voltage is induced in the other secondary winding. Thus an output will appear on the combined output lines of the secondaries when the movable core is moved away from its central position.

The outstanding feature of the linear differential transformer 30 is the extreme linearity of its output when compared with the movement of the movable core 80 which has as a deviation in the order of less than one percent.

This output signal is fed by means of tuning capacitor 86 to the induction modulator 66. Tuning capacitor 86 series resonates the secondaries 82 and 84 and windings 92 and 94 in a manner similar to capacitor 74. The induction modulator 66 is a Weston model 1408 Induction Modulator manufactured by Weston Electrical Instrument Corporation, a subsidiary of Daystrom, Incorporated, Newark 5, New Jersey. The induction modulator 66 comprises a pair of magnetic pole pieces 88 and 90 having a pair of windings 92 and 94 mounted thereon which are connected in series. Mounted between the pole pieces 88 and 90 is a standard galvanometer unit which is indicated in Fig. 2 by the numbers 96 indicating the core and the galvanometer coil which is marked 98. The tachometer generator 54 feeds a D.C. signal proportional to the rotational speed or r.p.m. of the shaft 12 to the movable coil 98.

Movable coil 98 is normally mounted at an electrical right angle to coils 92 and 94. When the current in the D.C. tachometer 54 energizes the coil 98 the resultant magnetic field reacts with the field produced by the galvanometer core 96 and causes the coil to deflect through a small angle. As the angle of the core 98 changes from a right angle position with respect to the coils 92 and 94 an alternating voltage is induced in the coil 98 from the alternating current in coils 92 and 94 which is then passed out through blocking capacitor 100 to shaft horse power amplifier 68, horse power recorder 70, and horse power indicator 72. Since the A.C. current in coils 92 and 94 is proportional to the output of the differential transformer 30 which is proportional to the torque developed by the shaft, the alternating magnetic field in the modulator 66 will therefore be proportional to the torque in shaft 12. Since the deflection of movable coil 98 is proportional to the r.p.m. of the shaft 12 due to the current from D.C. tachometer 54, the alternating output from the coil 98 will therefore be proportional to the product of the torque applied to the shaft and the r.p.m. of the shaft or the horse power. The induction modulator 66 according to laboratory tests is linear within 1 percent. Proper calibration may reduce this error since the output vs. input curve is very smooth.

D.C. current from the tachometer 54 is also fed the r.p.m. amplifier 60, r.p.m. recorder 62 and r.p.m. indicator 64.

The output of the differential transformer 30 is also fed to the shaft torque amplifier 44, torque indicator 48, and torque recorder 46. Phase shifting networks 102 are also shown in the horse power and torque signal lines for correcting any undersirable phase shift in the system.

As an example the tachometer generator 54 used was an Esterline Angus model D having a 25 volt output at 1000 r.p.m. with an error of plus or minus one percent. For the recorders a Sanborn Recorder 154 was used.

It should be understood, of course, that the foregoing disclosure relates to only a preferred embodiment of the invention and that it is intended to cover all changes and modifications of the example of the invention herein chosen for the purposes of the disclosure, which do not constitute departures from the spirit and scope of the invention.

What is claimed is:

1. A linear shaft horse power recording system comprising a stabilized oscillator for generating an alternating electric wave of constant frequency and amplitude; a linear differential transformer comprising two equal primary windings connected in series addition and connected to said oscillator, a magnetic core located centrally in said windings and adapted to be operated by a torque lever arm on said shaft, and two equal output windings placed around said core connected in series opposition; an induction modulator for calculating the horse power transmitted by said shaft comprising a stationary magnetic core having an A.C. winding thereon connected to said output windings of said transformer and a movable coil mounted in the magnetic circuit of said stationary core; a D.C. tachometer geared to said shaft for generating a voltage proportional to the rotational speed of said shaft; wire means for connecting the output of said tachometer to said movable coil whereby said coil will be deflected by an amount proportional to the speed of said shaft; and an indicator and a recorder connected to said movable coil responsive to the A.C. voltage induced in said coil which is proportional to said deflection and to the voltage on said A.C. winding whereby a useful linear output proportional to the horse power transmitted by said shaft may be obtained.

2. A linear shaft horse power indicating system comprising a stabilized oscillator for generating an alternating electric wave of constant frequency and amplitude; a linear differential transformer comprising two equal primary windings connected in series addition and connected to said oscillator, a magnetic core located centrally in said windings and adapted to be operated by a torque lever arm on said shaft, and two equal output windings placed around said core connected in series opposition; an induction modulator for calculating the horse power transmitted by said shaft comprising a stationary magnetic core having an A.C. winding thereon connected to said output windings of said transformer and a movable coil mounted in the magnetic circuit of said stationary core; a D.C. tachometer geared to said shaft for generating a voltage proportional to the rotational speed of said shaft; wire means for connecting the output of said tachometer to said movable coil whereby said coil will be deflected by an amount proportional to the speed of said shaft; and an indicator connected to said movable coil responsive to the A.C. voltage induced in said coil which is proportional to said deflection and to the voltage on said A.C. winding whereby a useful linear output proportional to the horse power transmitted by said shaft may be obtained.

3. A linear shaft horse power recording system comprising generating means for producing an alternating current wave of constant frequency and amplitude, a linear differential transformer comprising two equal primary windings connected in series addition and connected to said generating means, a core of magnetic material located centrally in said windings and adapted to be operated by a torque lever arm on said shaft, and two equal output windings placed around said core and connected in series opposition; an induction modulator for calculating horsepower transmitted by said shaft comprising a stationary magnetic core having an A.C. winding thereon connected to said output windings of said transformer and a movable coil mounted in the magnetic circuit of said stationary core; voltage generating means geared to said shaft for generating a voltage proportional to the rotational speed of said shaft; means for connecting the output of said voltage generating means to said movable coil whereby said coil will be deflected by an amount proportional to the speed of said shaft; and an indicator and a recorder connected to said movable coil responsive to the A.C. voltage induced in said coil which is proportional to said deflection and to the voltage on said A.C. winding whereby a useful linear output proportional to the horsepower transmitted by said shaft may be obtained.

4. A linear shaft horse power indicating system comprising generating means for producing an alternating current wave of constant frequency and amplitude, a linear differential transformer comprising two equal primary windings connected in series addition and connected to said generating means, a core of magnetic material located centrally in said windings and adapted to be operated by a torque lever arm on said shaft, and two equal output windings placed around said core and connected in series opposition; an induction modulator for calculating horse power transmitted by said shaft comprising a stationary magnetic core having an A.C. winding thereon connected to said output windings of said transformer and a movable coil mounted in the magnetic circuit of said stationary core, voltage generating means geared to said shaft for generating a voltage proportional to the rotational speed of said shaft; means for connecting the output of said voltage generating means to said movable coil whereby said coil will be deflected by an amount proportional to the speed of said shaft; and an indicator connected to said movable coil responsive to the A.C. voltage induced in said coil which is proportional to said deflection and to the voltage on said A.C. winding whereby a useful linear output proportional to the horsepower transmitted by said shaft may be obtained.

References Cited in the file of this patent

UNITED STATES PATENTS

| | | |
|---|---|---|
| 955,988 | Osburn | Apr. 26, 1910 |
| 2,494,579 | Pimlott et al. | Jan. 17, 1950 |
| 2,530,022 | Mershon | Nov. 14, 1950 |
| 2,640,352 | Ellison et al. | June 2, 1953 |
| 2,826,064 | Hastings | Mar. 11, 1958 |

FOREIGN PATENTS

| | | |
|---|---|---|
| 527,835 | France | Aug. 3, 1921 |
| 612,749 | Great Britain | Nov. 17, 1948 |